Patented June 23, 1942

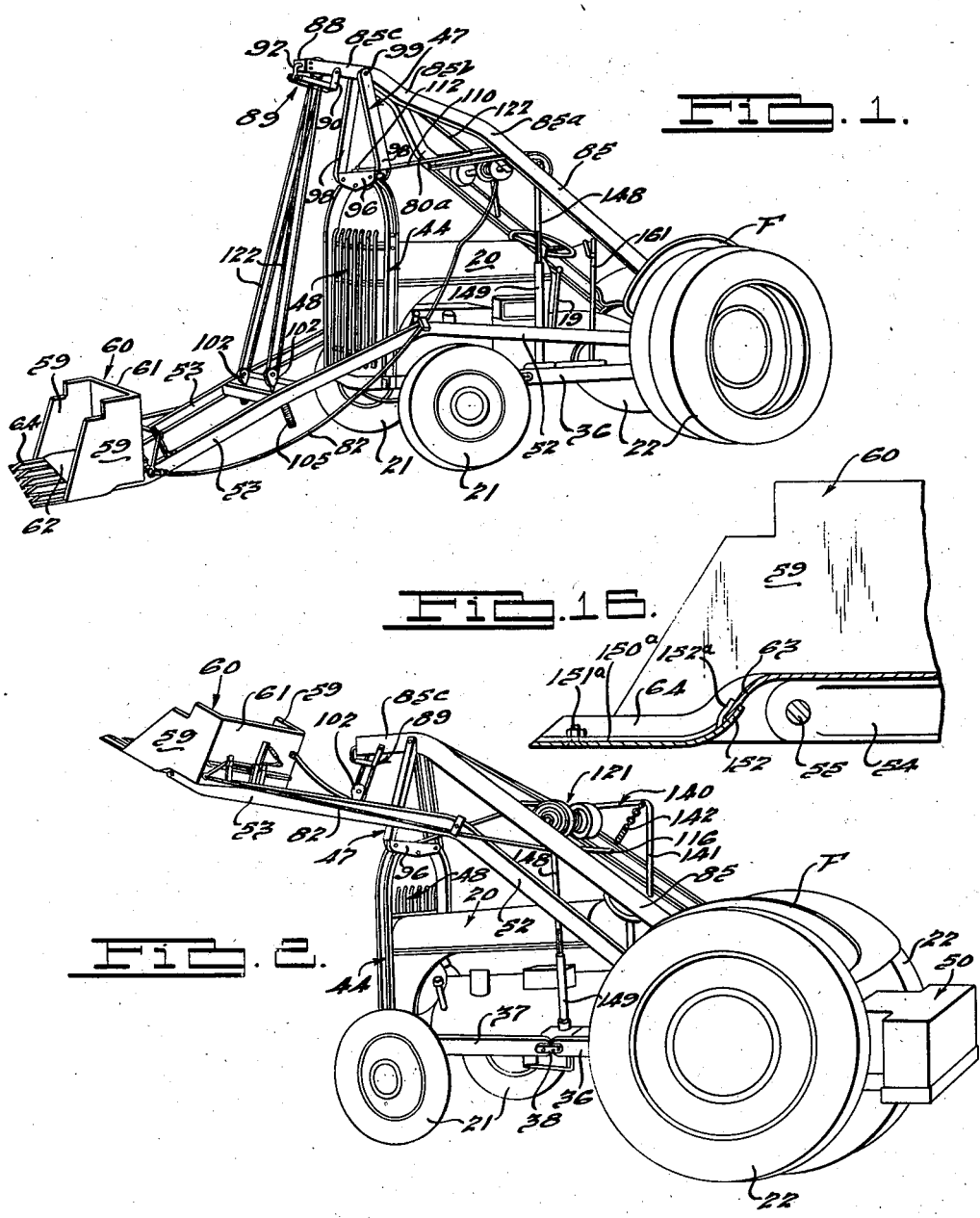

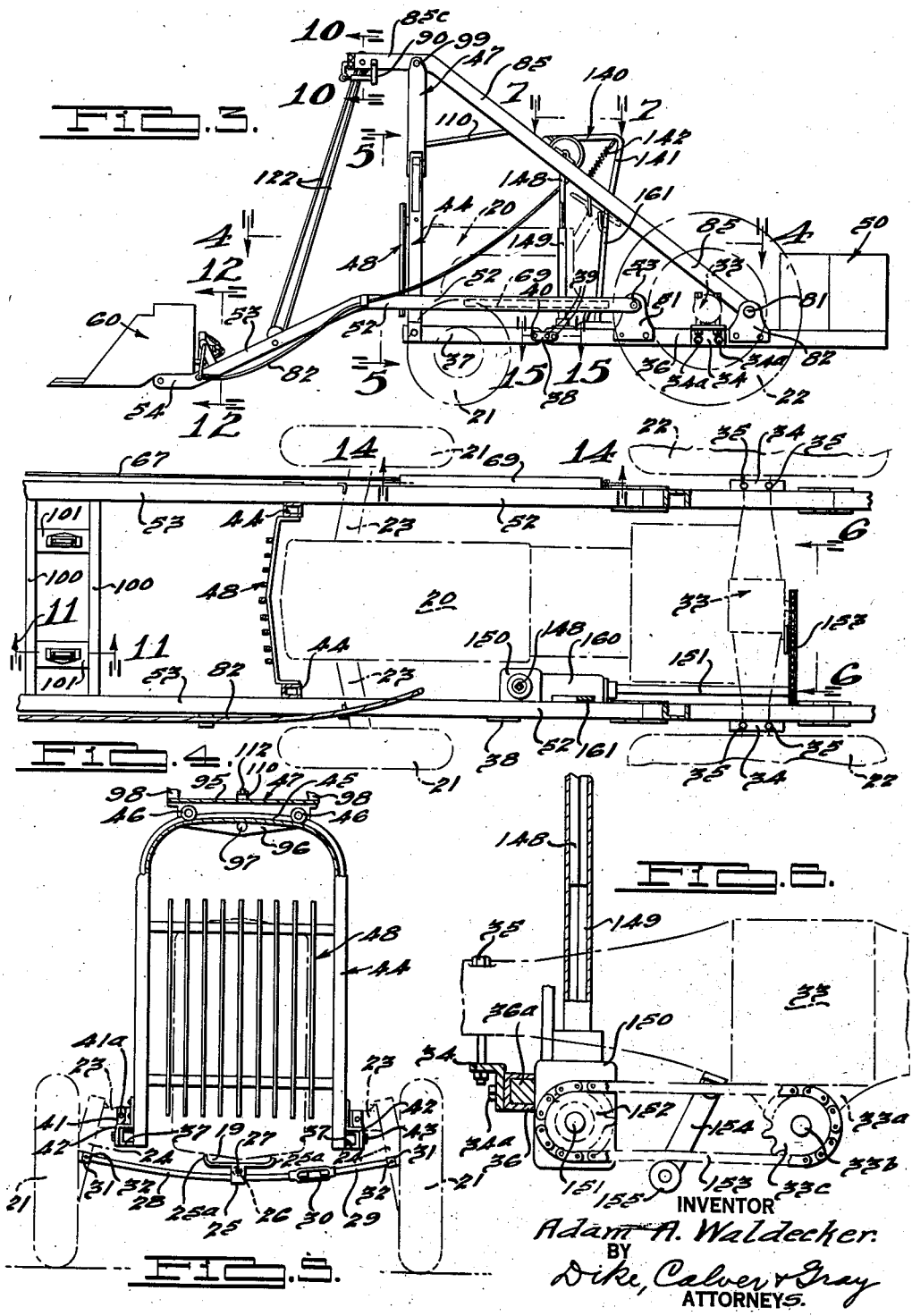

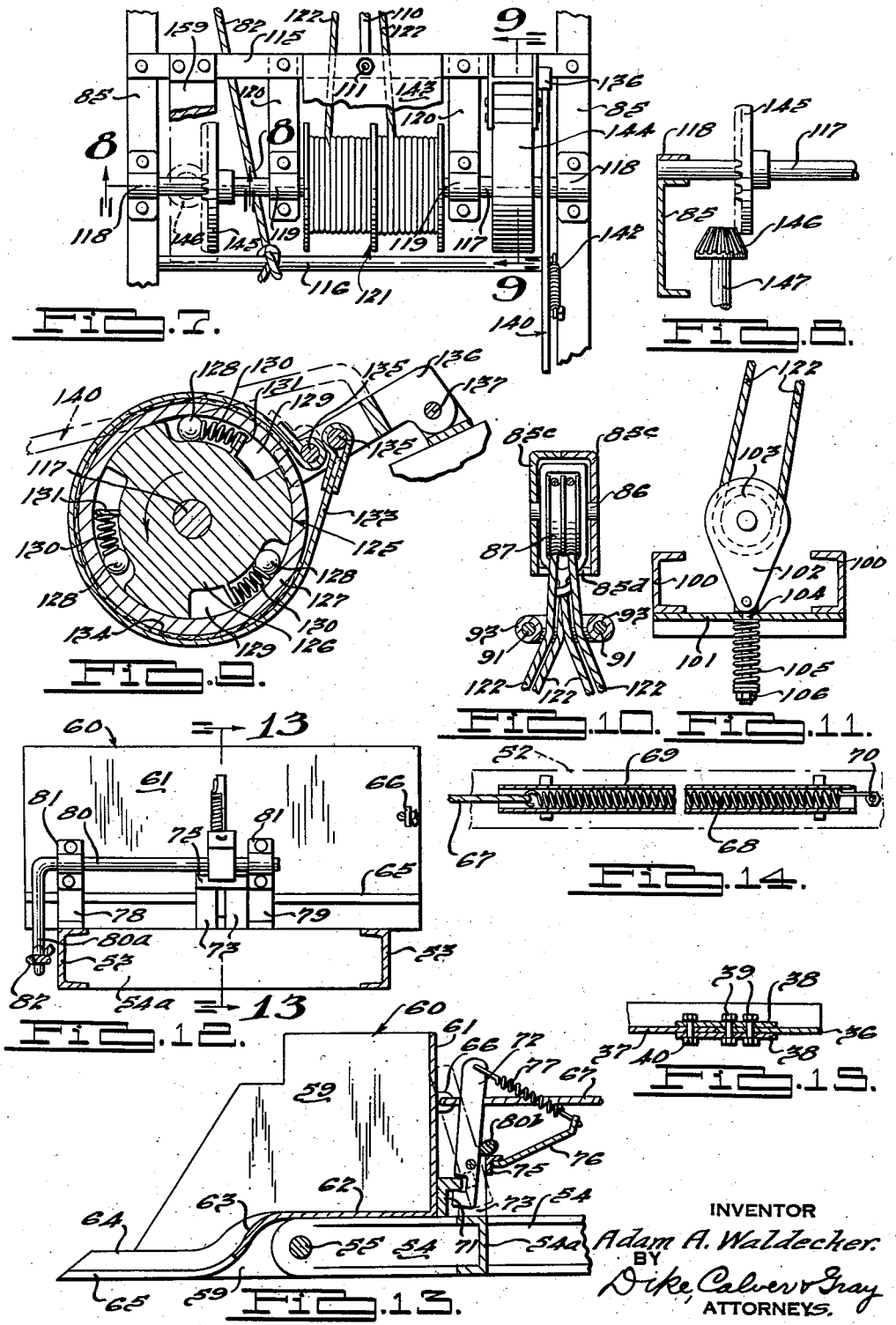

2,287,152

UNITED STATES PATENT OFFICE 2,287,152

POWER SHOVEL

Adam A. Waldecker, Dearborn, Mich.

Application February 20, 1941, Serial No. 379,825

8 Claims. (Cl. 214—140)

This invention relates to power shovels such, for example, as power shovels adapted to be attached to and operated by the power driven mechanism of a farm tractor of any conventional construction. The power shovel in accordance with the present invention is adapted to be operated mechanically, hydraulically or electrically, dependent upon the type of motive power which is employed to drive the tractor to which it is attached.

One of the objects of the present invention is to provide an improved power shovel of the foregoing type which is capable of collecting, elevating, transporting and dumping relatively heavy loads of loose materials of various kinds.

A further object of the present invention is to provide an improved power shovel attachment for application to a tractor of standard construction and one in which the load shovel is supported and counterbalanced in a manner which prevents any possibility of tipping over of the tractor to which it is attached.

Another object of the present invention is to provide an improved power shovel of the foregoing character which is capable of being attached to a standard tractor without the necessity of remodeling or reorganizing the operative parts of the tractor to which it is attached.

A further object of the present invention is to provide means for mechanically elevating or lifting the shovel by means of the force or power for driving the tractor and manual means for releasing or tripping the shovel proper to dump the load at any desired point or place.

Another object of the present invention is to provide an improved power shovel and associated mechanism which, when applied to a standard type of tractor, is of such a nature that the tractor with the power shovel attached thereto may be placed upon a truck and transported from place to place; and one in which the overall height of the tractor and power shovel mechanism when in position on a truck is of minimum height, thus permitting the tractor to be transported over the highways and beneath viaducts on the truck without necessitating dismantling of the power shovel from the tractor which supports it.

The foregoing and other objects and advantages of the present invention will appear from the following description and appended claims, when considered in connection with the accompanying drawings forming a part of the present specification, wherein like reference characters designate corresponding parts in the several views.

In said drawings:

Fig. 1 is a perspective view of one embodiment of power shovel in accordance with the present invention, shown applied to a four wheel type of farm tractor.

Fig. 2 is a perspective view of the structure of Fig. 1, showing the power shovel in elevated position.

Fig. 3 is a longitudinal elevational view of the structure shown in Figs. 1 and 2.

Fig. 4 is an enlarged horizontal sectional view taken substantially along the line 4—4 of Fig. 3, looking in the direction of the arrows.

Fig. 5 is a front elevational view, partly in section, taken substantially along the line 5—5 of Fig. 3, looking in the direction of the arrows.

Fig. 6 is an enlarged fragmentary rear elevational view, taken substantially along the line 6—6 of Fig. 4, looking in the direction of the arrows.

Fig. 7 is an enlarged top plan view partly broken away, taken substantially along the line 7—7 of Fig. 3, looking in the direction of the arrows.

Fig. 8 is an enlarged sectional view taken substantially along the line 8—8 of Fig. 7, looking in the direction of the arrows.

Fig. 9 is a sectional view taken substantially along the line 9—9 of Fig. 7, looking in the direction of the arrows.

Fig. 10 is an enlarged sectional view taken substantially along the line 10—10 of Fig. 3, looking in the direction of the arrows.

Fig. 11 is an enlarged detail sectional view, taken substantially along the line 11—11 of Fig. 4, looking in the direction of the arrows.

Fig. 12 is an elevational view, partly in section, taken substantially along the line 12—12 of Fig. 3, looking in the direction of the arrows, and showing the back end of the shovel.

Fig. 13 is a vertical sectional view taken substantially along the line 13—13 of Fig. 12, looking in the direction of the arrows.

Fig. 14 is an enlarged detail sectional view taken substantially along the line 14—14 of Fig. 4, looking in the direction of the arrows.

Fig. 15 is an enlarged fragmentary detail sectional view, partly in elevation, taken substantially along the line 15—15 of Fig. 3, looking in the direction of the arrows; and Fig. 16 is a view similar to Fig. 13 and showing a somewhat modified shovel structure embodying the present invention.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring now particularly to the drawings, the power shovel and operating mechanism therefor, as well as the supporting frame and other portions of the power shovel structure are shown as applied to a farm tractor indicated as a whole at 20. The engine of the tractor is provided with a crankcase 19 and the tractor has a pair of front wheels 21 and a pair of power driven rear wheels 22. The front wheels 21 are supported upon a front axle 23 having spindle housings 24 and the rear wheels 22 are supported by a rear power axle shown as a whole at 33.

Referring particularly to Fig. 5 of the drawings there is shown a bearing support or plate 25 having upturned side end portions which engage the side walls of the crankcase 19. The lower end of the bearing support 25 is preferably bifurcated or U-shaped to support a roller 26 mounted upon a horizontal pin 27. The pin 27 supports the roller for rotation.

A truss rod comprising sections 28 and 29 whose adjacent inner ends are connected together by means of a turnbuckle 30 is provided for the purpose of holding the front wheels 21 of the tractor in their proper positions and thus preventing them from spreading at the bottom under loads. The outer opposite ends of the truss rod sections or portions 28 and 29 carry U-shaped or loop-like clamps 31 and these clamps are held in engagement with the spindle housings 24 by means of bolts or the like 32.

The power shovel unit of the present invention is adapted, as stated above, to be applied to any conventional type of farm tractor and consists of a shovel or scoop and supporting framework which may be applied or adapted to the tractor and secured thereto without in any way necessitating the reorganization of the tractor construction.

The rear axle 33 of the tractor is of conventional construction but is provided, as shown, with a downwardly projecting housing portion 33a for the purpose of housing a rearwardly extending or projecting short drive or jack shaft 33b to the outer end of which is attached a sprocket or other gear member 33c.

The frame structure or harness of the so-called power shovel unit or attachment for the tractor is adapted to be attached to and supported by the transversely spaced longitudinally extending articulate frame members of the tractor, which, as shown, are composed of a pair of rear sections or portions 36 and a pair of forward sections or portions 37. As shown, these frame members 36 and 37 are preferably of channel formation. The rear frame members or sections 36 are preferably attached to the rear axle structure 33 by means of angle plates 34, see particularly Figs. 3, 4 and 6, which are held with relation to the axle by means of bolts 35. These bolts 35 serve also to support the fenders F, see particularly Figs. 1 and 2, for the rear wheels 22. The upright leg or portion of the angle member 34 is secured to the rear channel frame member 36 in any suitable manner, as by means of bolts 34a. It is to be noted, with particular reference to Fig. 6 of the drawings, that the channel member 36 is reinforced by a filler 36a to give additional strength to this frame member at certain points in its length.

As clearly seen in Figs. 3 and 15, the adjacent ends of the frame sections or portions 36 and 37 are slightly spaced apart and are preferably pivotally secured together by means of plates 38, the plates being located on opposite faces of the webs or upright portions of the channel members 36 and 37. The rear portions of the plates 38 are rigidly secured to the rear frame member 36 by a pair of bolts 39 and the forward portions of these plates are pivotally attached to the web of the frame member 37 by a single bolt 40. Thus, it will be seen, that the frame sections 37 may move or pivot relative to the sections 36.

As best seen in Fig. 5, a steel hanger or support 41 in the form of a piece of twisted strap steel is fastened at its upper end by a single bolt 41a to the front axle 23. The lower end or portion of the strap or hanger member 41 is secured by a single bolt to the outer face of the web portion of the front frame section 37. The point of supporting connection between the front axle and the frame member 37 is located a short distance rearwardly of the forward end of the frame member 37. As seen in Fig. 5, one such supporting or connecting strap member or hanger 41 is provided at each side of the frame. Substantially Z-shaped supporting members or brackets 42 are connected to the outer faces of the web portions of the longitudinal frame sections 37 by single bolts 43 and to the upright leg portions of an arched or inverted substantially U-shaped frame or boom supporting member shown as a whole at 44. This arched member 44 is, as shown, in the form of an inverted U has an upright transversely spaced leg portions each of which is connected in like manner by the substantially Z-shaped member 42 to the forward end of a frame section 37. The upper end of the U-shaped frame member 44 provides an arched or curved surface 45 which is adapted to be engaged by and provides a track for spaced rollers 46. These rollers 46, as shown, are carried by a yoke-like supporting member which is shown as a whole at 47 and which will be described in detail hereinafter. As best seen in Figs. 4 and 5, the leg portions of the member 44 are rectangular in cross section from their lower ends to points adjacent the arched or curved upper portion of the frame member, the said arched or curved portion being shown herein as of channel formation with the rollers 46 engaging the web portion 45 of the channel. It will be understood that by virtue of the rollers and the rolling contact of the member 47 with relation to the arch-shaped member 44 that tilting movement laterally of the member 44 will not affect the position of the member 47. This is an important feature of the present invention since it is desirable to maintain the boom supports and other superstructure of the power shovel attachment or unit in fixed vertical or upright positions at all times regardless of the uneven surfaces over which the tractor is travelling. The advantage of this will be apparent from the following description relating to the structure.

The inverted U-shaped frame structure 44 also provides means for supporting a guard shown as a whole at 48. This guard is, of course, provided to protect the radiator core and other front end structure of the tractor 20.

As best seen in Figs. 2 and 3, the rear or inner longitudinal frame members or sections 36 are preferably extended rearwardly beyond the rear axle 33 and the rear wheels 22 to provide a support for a counterweight shown as a whole as a box-like structure 50. It will be understood that one purpose of this counterweight 50 is to maintain the tractor and the power shovel attachment in balance when the power shovel is operated and elevated with a load. The counterweight structure 50 likewise provides a convenient tool box for the tractor. Fig. 2 shows the counterweight and tool box 50 as being substantially T-shape in horizontal cross section. It will be understood, however, that this member 50 may be of any desired size, shape or weight. In the event that added weight is needed to counterbalance the power shovel during the handling of extra heavy loads, the box-like container 50 provides means for receiving more counterweight.

The frame members 36 on opposite sides of the structure are provided in advance of the rear axle 33 with upright brackets or supporting members 51. These brackets or supporting members are preferably attached to the frame members 36 by means of bolts, rivets or the like, and provide suitable supports or bearings for the inner ends of longitudinally extending booms or so-called boom sticks or members, shown as a whole at 52. With particular reference to Fig. 3 of the drawings, it is to be noted that the booms or boom sticks 52 are pivoted at 53 to the brackets 51 and that they extend forwardly throughout a portion of their length in a substantially horizontal plane when the shovel is in its lowered position. At a point in advance of the frame member 44 and the guard 48, the boom sticks extend downwardly toward the ground. These downwardly projecting portions of the boom sticks 52 are shown as a whole at 53. The forward end of each of the members 53 terminates in a horizontally extending portion 54, this portion normally extending in a plane which is substantially parallel to the plane of the portion 52 of the boom sticks. The boom stick portions 52, 53, 54 are preferably of channel formation as clearly seen in Fig. 12 of the drawings although it will be understood that they may be formed of any desired cross section. The end portions 54 of the boom sticks together provide bearings for receiving and supporting a transversely extending pivot or rock shaft 55 which is attached to the opposite walls 59 of a shovel or bucket, shown as a whole at 60.

The bucket 60 is, as shown, provided with end walls 59, a rear wall 61 and a partial bottom wall or floor 62 which, as shown, toward its forward end, is curved downwardly and forardly at 63. The base or bottom of the bucket 60, in addition to the solid floor or base portion 62, 63, is provided with a plurality of teeth 64, five such teeth being shown in the drawings, merely by way of illustration. It will be understood, however, that any desirable number of teeth may be employed, this number being dependent upon the type of material which the power shovel bucket is adapted to be used with.

As will be readily understood, the bucket 60 is pivotally mounted by means of the shaft 55 so that it can tip forwardly about said pivot connection. It is to be noted that the bottom faces or surfaces 65 of the bucket teeth and the bottom surfaces of the channel frame portions 54 extend in substantially the same plane so that when the boom sticks 52 are in their lowered position as best seen in Figs. 1 and 3 of the drawings, the bucket per se will rest flat upon the ground. Thus, in use, the bucket will remove material from the actual surface of the ground. This flatwise resting position of the bucket is made possible by reason of the fact that the floor portions 62, 63, are disposed above the bottom or lower edges of the end or side walls 59 of the bucket.

The rear wall of the bucket is preferably provided with a short angle bar 71 which is fastened to the bucket wall in any suitable manner as by welding or riveting in place. The rear wall 61 of the bucket is provided adjacent one end thereof with an eye or other suitable projection 66 to which the end of a cable 67 may be attached. As seen in Figs. 3, 4 and 14, the rear or inner end of the cable 67 is preferably attached to a coiled tension spring 68 which, as shown, is mounted in a housing 69 carried by or attached to the boom stick portion 52 at the right side of the tractor. The rear end of the coiled spring 68 is attached at 70 to an eye bolt or other member carried by the boom stick. The purpose of the cable 67 and the attached spring 68 is to maintain the cable under tension and taut as shown in Fig. 13. The tendency of the cable and the tension spring is to maintain the bucket 60 normally in its upright position as shown in Figs. 3 and 13.

Referring now particularly to Figs. 12 and 13 of the drawings, it will be seen that the bucket or shovel 60 is maintained in its upright or horizontal position by a pivoted latch member 72 having a cutout or notched portion providing a hook-like member which engages the angle 71 carried by the rear wall 61 of the bucket. The transverse channel member or bar 54a carries a pair of spaced upright angle members 73 between which the pivoted latch member is mounted by means of a pin or pivot 74. The upright angle members 73 carry a transverse short angle 75 which is attached to the members 73 by welding or in any other suitable manner. A rearwardly and upwardly extending metal bracket member 76 is attached to the angle 75 and serves as a support for one end of a tension spring 77. The opposite end of the spring 77 is attached to the upper end of the latch member 72 and since the spring is under tension, the latch member is normally held in its full line position, as shown in Fig. 13 and with the hook or notched portion thereof engaging the angle member 71 on the bucket wall.

The cross frame member or channel 54a supports an upright metal bracket 78 which has its lower end portion bent at right angles and secured to the frame member 54a. A similar upright bracket or supporting member 79 is provided adjacent the latch 72 and the angles 73 and likewise has its lower or bottom end turned rearwardly at substantially a right angle and secured to the frame member 54a. The purpose is to provide two upright supports which are spaced rearwardly from and are independent of the bucket 60. As seen in Fig. 13, each of these upright supports 78 and 79 provide one portion of a bearing or journal for a transversely extending shaft 80. As shown, this shaft extends inwardly from the left side wall of the bucket to a point beyond the center thereof and is held in substantially horizontal position by means of U brackets or strap members 81 which are bolted or otherwise secured to the upright brackets 78 and 79 to provide the other parts of the spaced bearings or journals for the shaft 80. The outer end of the shaft, at the left of Fig. 12, has a right angularly disposed portion 80a to which a pull rope or the like 82 is attached. The main portion of the shaft 80 is preferably out of round, particularly at the point in the shaft which is located opposite the pivoted latch member 72. This out of round portion of the shaft is shown at 80b in Fig. 13. The shaft 80 extends transversely of the machine behind the bucket or shovel 60 and is positioned above the angle 75. It will be understood that when the rope 80 is pulled by the operator, the offset end 80a of the shaft will rotate the shaft in a counterclockwise direction and the cam portion 80b thereof will force the pivoted latch 72 from its full line position to its broken line position of Fig. 13, thus releasing the hooked portion or nose of the latch from engagement with the angle 71. Therefore, if the bucket 60 contains a load of material and is in elevated position above the ground, the weight of the load will tilt or tip the bucket about its supporting pivot 55 against the action of the tensioned cable 67. After the load has been dumped, the tensioned cable 67 and the spring 69 to which it is attached, will tend to return the bucket 60 to its original horizontal or upright position. In moving into such position, the angle member 70 will trip the latch 72 and the spring 77 attached to the latch will force the hooked end or notch therein into engagement with the angle 71 to lock the parts together, as shown in Fig. 13.

Referring now particularly to Figs. 1, 2 and 3, the power shovel unit is provided with a pair of boom stick supports which are located above the longitudinal frame members 36 and 37 and also above the boom sticks 52. As best seen in Fig. 3, the boom supports 85 are pivotally mounted at their inner or rear ends by means of pivot pins, bolts or the like 81 to upright brackets 82 which, as shown, are secured to the frame members 36 by bolts, rivets or the like. It is to be noted that the supporting brackets 82 are positioned adjacent to but at the rear of the rear axle 33. As best seen in Figs. 1 and 2, the boom supports 85 extend forwardly and upwardly in parallel or substantially parallel relation to the points 85a. From the points 85a the boom supports converge toward one another to the points 85b and then extend forwardly in a substantially horizontal position to provide the forwardly extending portions 85c. The boom supports 85 may be of channel formation and at a point adjacent their forward or free ends the lower flanges of the channels are removed to provide an opening 85d as clearly shown in Fig. 10. The upper flanges of the channel members are in abutting relation. The upright portions or webs of the channel sections 85c provide bearings for a transverse shaft 86 whose ends are fixed to the webs. This shaft carries a twin pulley device 87 which is rotatably mounted on the shaft above the opening 85d. The forward ends of the cooperating channel portions 85c are filled by a metal block 88, see particularly Fig. 1.

The sections 85c of the boom supports carry a depending so-called twin fair lead or guide device shown as a whole at 89. The fair lead or guide comprises a depending substantially U-shaped bracket 90 secured to the channel sections 85c and supporting the rear ends of longitudinally extending short shafts 91. The forward ends of these shafts 91 are supported by a depending hook-like member or bracket 92 whose upper end is secured to the block 88 and whose lower end is provided with an eye or opening to receive a transversely extending bolt or pin which supports the forward ends of the shafts 91. Each shaft 91 is provided with an antifriction roller 93, see particularly Fig. 10.

The boom supports 85 are preferably maintained in their normal positions by means of the yoke-like frame member shown as a whole at 47 and previously referred to. As clearly seen in Figs. 1, 2 and 5, the yoke-like member 47 has a base portion 95 consisting of a web portion and front and rear depending walls 96, this base portion being substantially in the shape of an inverted U in cross section. As previously stated, the base portion carries rollers 46 which are adapted to engage the web of the frame member 44. The base portion 95 is removably supported upon the top of the frame member 44 and is held in place by means of a removable pin or bolt 97 which passes through the front and rear walls or portions 96 of said member and which is disposed on the opposite side of the arched portion of the frame 44 from the rollers 46. The yoke-like member 47 has a pair of upwardly extending converging arms or members 98 which together provide a substantially A-shaped frame. The upper ends of these members 98 are secured to the boom support sections 85c by means of a bolt or the like 99.

The boom supports 85 together with the mechanism to be hereinafter described provide means for the raising and lowering of the boom sticks 52 and the shovel or bucket 60.

Referring particularly to Figs. 1, 4 and 11, it will be seen that the sections 53 of the boom sticks are interconnected by means of a transverse skeleton frame structure which comprises, as shown, a pair of parallel transversely extending channel members 100 which are welded or otherwise secured to the boom sticks and which carry at spaced points metal plates or platforms 101. Referring particularly to Fig. 11, each of the platforms or plates 101 supports a pulley housing 102 which carries a pulley or roller 103. The pulley housing 102 is mounted upon the platform and is secured thereto by means of a depending bolt 104 which is surrounded by a cushioning coil spring 105 disposed below the plate 101, the bolt and spring being held in position by a nut 106.

The frame members 44 and 47 are maintained in their relative upright or substantially vertical positions by means of a bar or rod 110, see particularly Figs. 1 and 7, whose rear or inner end is secured at 111 to a transverse frame member supported by the boom supports 85. The forward end of the bar 110 is preferably flattened and provided with a series of holes or openings which are adapted to register with a vertically extending pin or stud 112 carried by the base plate 95 of the frame member 47. The front end connection of the bar or rod 110 may be clearly seen in Fig. 5. The front end of the bar 110 is held in position with relation to the pin by means of a cotter pin or key or in any suitable manner so that the bar or rod may be detached from the pin and the frame structure 47.

Referring now particularly to Fig. 7 of the drawings, there is shown therein, in detail, the power operated mechanism for raising and lowering the boom sticks 52 and the shovel or scoop 60. As shown, this mechanism is supported by means of a suitable frame structure which comprises a cross bar 115 whose opposite ends are bolted or otherwise secured to the boom supports 85, a brace bar or rod 116 whose opposite ends are attached to the webs of the boom supports 85, see also Fig. 2. The bar or rod 116 and the cross bar 115 together provide brace members for the boom supports 85 and the bar 116 also provides means for attaching the inner end of the rope or cable 82 which is used to release the shovel or scoop 60 at predetermined times.

The power operated mechanism for raising and lowering the boom sticks and the shovel is, as shown, see particularly Figs. 7, 8 and 9, mounted upon a transversely extending power driven shaft 117. This shaft is journalled at its opposite ends in suitable bearings 118 carried by or forming a part of the boom supports 85. The shaft 117 is also journalled or supported intermediate its ends by additional bearings 119 which bearings are attached to longitudinally extending brace members or brackets 120 which are attached, as by means of bolts to the cross bar 115, as shown in Fig. 7. Thus, the power driven shaft 117 is firmly supported for rotation when power is applied thereto.

A twin cable winding drum, spools, or the like, shown as a whole at 121, is rigidly mounted upon the approximate central portion of the power driven shaft 117 and is, as shown, located between the bearings 119. When the power driven shaft 117 is driven or rotated in a counterclockwise direction, the twin drum is likewise rotated in a counterclockwise direction to wind onto the sections of the drum the cables 122.

It will be understood that a separate cable 122 is provided for each half or section of the twin drum structure 121 and that one end of each cable is attached, in any suitable manner, as by means of cable clamps to the structure adjacent the twin pulley device 87, see particularly Fig. 10. The cables 122 extend around the pulleys 103 mounted upon the platforms 101 and extend upwardly and over the twin pulley device 87 and rearwardly to the sections of the twin drum 121. The opposite ends of the cables 122 are attached to the sections of the drum in any suitable manner. Thus, when the drum 121 is rotated or driven in a counterclockwise direction by virtue of applying power to the power driven shaft 117, the boom sticks 152 and the shovel 60 are elevated toward the twin pulley device 87. This action will, of course, shorten the stretches of cable between the pulleys 102, 103 and the twin pulley device 87 by reason of the fact that as the drum 121 rotates the cables will be wound onto the drum. The stretches of cable from the twin pulley device to the drum 121 diverge and as best seen in Fig. 1, extend between the opposed frame members or boom supports 80.

The power driven shaft 117 supports adjacent its right end as shown in Fig. 7, a clutch device which is shown as a whole at 125, see particularly Fig. 9. The clutch device 125 may be of any suitable kind and, as shown, comprises a friction type of clutch having an inner disk-like member or block 126 and a cup-like housing having an annular flange 127. The inner clutch member 126 is, as shown, mounted upon the power driven shaft 117 to be rotated with said shaft. Spring pressed ball bearings 128 are located in spaced pockets or cutout portions 129 in the block or member 126 and are interposed between said block and the flange 127. Coil springs 130 are located in the spaces 129 and support the ball bearings 128. The opposite ends of the springs engage fixed stops or lugs 131 which are rigidly attached to the clutch disk or member 126. It will be understood that the parts of the clutch herein described are more or less of standard construction and while a certain type of clutch has been disclosed herein, it will be understood that any suitable type of clutch might be used with the power operated lift mechanism of the present invention. It will be understood that with the parts in the positions in which they are shown in Fig. 9, when the power driven shaft 117 is rotated or turned in a counterclockwise direction as indicated by the arrow in this figure, the clutch disk or block 126, the balls 128, the springs 130 and the stops or lugs 131 will revolve as a unit while the clutch housing including the flange 127 will remain stationary. When the shovel 60 has been elevated and the power disengaged from the lift mechanism, the weight of the load in the shovel tends to turn the shaft 117 in the opposite or clockwise direction. This will turn the clutch member 126 in the same direction. Upon so turning, the ball bearings or rollers 128 will be wedged between the inner member 126 and the flange 127 of the clutch housing to lock or bind the parts together and prevent the accidental or unauthorized lowering of the shovel 60. To lower the shovel, it is necessary to release the external brake band, to be described below, which allows the clutch member 126 and the clutch housing 127 to rotate as a unit with the shaft 117.

As shown in Fig. 9, an external type of band brake or the like 133 is employed to engage the flange 127 of the clutch housing. This band brake 133 is provided with conventional brake lining 134 and the opposite ends of the brake are mounted upon supporting pins 135 carried by a bracket member 136 which is pivotally mounted at 137 to the framework of the machine. The band brake may be contracted and/or released by means of a hand lever shown as a whole at 140. This hand lever 140 as shown, extends rearwardly in a substantially horizontal plane toward the position where the operator of the tractor is seated and has its inner or rear end turned downwardly at 141 to provide a hand gripping portion for the lever. The brake 133 is maintained in braking position relative to the clutch by means of a tension spring 142. One end of this spring is attached to the clutch release lever and the opposite end to the boom support or frame member 85. The purpose of this spring is to maintain the brake applied at all times except when the hand lever is lifted or operated to release it. It will be understood that other types of brake mechanism may be employed within the purview of the present invention.

It is, of course, desirable to provide guard members or shields for the twin cable drum 121 and also for the clutch and brake structure. Therefore, sheet metal or other shield members 143 and 144, respectively, are provided. As shown, these shields or guards are preferably attached to the cross bar 115 and extend rearwardly and downwardly over the twin drum and the clutch and brake units. These shields may, however, be mounted or supported in any other suitable manner. The shield 143 serves an important purpose in that since the cable winding twin drum 121 is mounted directly in front of the operator of the machine, it is desirable to prevent any possibility, should a cable break, of the end thereof coming in contact with the operator. By reason of providing the shield 143 such danger is entirely overcome.

Referring further to Fig. 7, it will be seen that a ring gear 145 is rigidly mounted on the shaft 117 for rotation therewith. As clearly shown in Fig. 8, this ring gear 145 is in constant mesh with a beveled pinion gear 146 which is mounted upon a vertically extending power driven shaft 147. The lower end portion of the shaft 147 has, as shown in Fig. 6 at 148, a square cross section and is adapted to fit into a similarly cross sectioned tube or sleeve member 149. This tube 149 extends downwardly and into a gear box 150 which, as shown, is mounted against the inner face of the longitudinal frame member 36 at the point in said frame member where the frame is reinforced by the block or reinforcing member 36a, see particularly Fig. 6. The gears in the gear box 150 may be of any desirable construction such for example as a bevel pinion mounted on the lower end of the tube 149 which meshes with a similar pinion mounted on the inner end of a shaft 151. As seen in this figure, the outer end of the shaft 151 carries a sprocket or gear 152 with which the sprocket chain 153 meshes. This sprocket chain 153 serves to interconnect the driving sprocket or gear 33c with the driven sprocket or gear 152 when the transmission mechanism is operated to drive the short shaft 33b. It is, of course, desirable to maintain the sprocket chain 153 taut and to remove any slack therein. For this purpose, I have provided a depending bracket or the like 154 which carries at its lower end a roller 155 which is adapted to engage the outer edges of the sprocket chain 153. It will be understood that by adjusting this slack take-up device, the chain will be kept taut at all times.

Referring now particularly to Fig. 4 of the drawings, there is provided adjacent the gear box 150 previously described, a clutch casing or housing 160. This housing contains a positive clutch for throwing in and out of mesh the take-off drive from the rear end of the differential, namely, that which comprises the gears 33c and 152, the sprocket chain 153 and the horizontally extending shaft 151. With reference to this figure, it will be seen that the shaft 151 extends forwardly and into the clutch housing 160. A suitable clutch lever 161 is provided and extends upwardly into position to be easily grasped by the operator of the tractor. The positive clutch mechanism and the lever for actuating it may be of any desired conventional construction.

The gears 145 and 146 are shielded by means of a cover member or plate 159 whose forward end or edge is attached to the cross bar 115 and which extends rearwardly and downwardly so as to cover the gear 145 as well as the gear 146. Thus, all of the moving parts of the power operated lift mechanism are covered by safety shield members.

By virtue of providing the telescoping shaft 148 and the tube 149 which have cooperating squared cross sections, it is possible to elevate the boom supports 85 relative to the longitudinal frame members 36 and 37 of the power shovel unit. Moreover, by virtue of the fact that the so-called A-shaped frame 47 may be released from its position, as shown in the drawings, and separated from the frame member 44 by simply removing the cotter pin or key from the stud or pin 112 and by releasing the longitudinal bar or rod 110 and also by removing the locking pin 97, see Fig. 5, the superstructure of the machine, namely, the boom supports 85 and the frame 47 and attached parts, may be lowered relative to the frame 44 and the tractor itself. This is desirable to permit the tractor and its attached power operated shovel unit to be transported on a truck. By being able to release the superstructure and lower it with relation to the lower portions of the structure, as described, it will be understood that the overall height of the tractor with the attached power shovel unit mechanism will be greatly reduced. It is to be understood further, that the entire unit, namely, the power shovel and the means for operating it, may be dismantled from the tractor in a relatively short space of time if this proves desirable.

Referring now particularly to Fig. 16 of the drawings, there is shown in this figure a somewhat modified type of power shovel, scoop or bucket. In the present form of the invention, the bucket per se is substantially like that shown at 60 in the preceding views but, in addition to the structure previously described, is provided with a removable plate or false bottom 150a which is secured to the underfaces of the teeth of the shovel by bolts and nuts 151a. The inner or rear edge of the plate 151a is provided with struck-up portions or fingers 152a, some of which extend above the adjacent surface or floor portion 63 of the shovel and others beneath this portion of the floor. It will be understood that the plate is slipped into position beneath the teeth 64 and the alternate fingers or portions 152a brought into engagement with the floor portion 63. The bolts and nuts 151a are then applied to attach the removable floor or plate portion 150a to the shovel. This particular type of shovel has the advantage of adapting the power shovel structure for use in collecting loose material, such as dirt, and with the present form of the invention, the machine may be employed to remove material from a surface in substantially the same manner as hand shovels and brooms would be employed for this purpose.

From the foregoing, it will be seen that I have described a preferred and improved form of power operated or driven mechanism for actuating a power shovel, the source of power being derived from the tractor or other machine to which the shovel and its associated parts and mechanism are attached.

The operation of the power shovel or attachment embodying the present invention is substantially as follows:

With the power shovel 60 in its lowered position, as shown in Figs. 1 and 3 of the drawings, the operator depresses the clutch pedal of the tractor, moves the clutch control lever 161 with the transmission gear shift lever 19 in neutral position to throw into mesh the jack shaft 33b. Thus, by driving the differential mechanism of the rear axle 33, the sprocket chain 153 drives the sprocket 152 and rotates the horizontal shaft 151 which in turn imparts a rotative motion or movement to the telescoping shaft and tube 148 and 149, respectively, to drive the bevel pinion gear 146 and the ring gear 145 to rotate the shaft 117 in a counterclockwise direction. This rotation of the shaft in turn rotates the clutch mechanism shown in detail in Fig. 9 and also rotates the twin drum 121 to wind the cable 122 and elevate the boom sticks 52, 53 by drawing up the cables to lift the power shovel 60 to a position such as that shown in Fig. 2 of the drawings. When the shovel and its load have been elevated to this position, the rope or cable 82 is pulled to release the latch 72 and the weight of the material in the shovel 60 will tip it about its pivotal point or shaft 55 to dump the load. When the shovel is in elevated position the clutch mechanism 125 maintains the cables 122 taut to hold the shovel in such elevated position. It will be understood that the band brake 133 is in gripping engagement with the flange or wall 127 of the clutch housing or member and thus the shovel will not return to its lowered position. After the load has been dumped from the shovel, the brake release lever 140 may be operated to release the brake and the weight of the shovel will lower it to its original or ground position or to any point between its upper and lower limits, the position to which it is lowered being determined by the manual control of the band brake. During this lowering movement and as the teeth of the shovel touch the ground, the shovel will be tipped rearwardly to its normal locked position at which time the latch actuating spring 77 returns the latch 72 to its locked position, as shown in Fig. 13.

The power shovel may be easily operated and controlled by means of the various instrumentalities described above and it is to be noted that the means for controlling the operation or actuation of the shovel are all located within convenient reach of the operator of the tractor. Moreover, as stated above, the improved power shovel unit or structure of the present invention may be easily applied or attached to a conventional tractor or other similar machine without necessitating the reorganization of the tractor or its component parts.

I claim:

1. A power shovel unit adapted to be mounted upon a tractor and operated thereby, comprising articulated longitudinal frame members detachably connected to the front and rear axles of said tractor, a pair of boom sticks pivotally mounted at their inner ends to said frame members at points located in front of said rear axle, said boom sticks extending longitudinally of the tractor to points in advance of the front end of said tractor and having an interconnecting transversely extending reinforcing frame member therebetween located intermediate the forward ends of said boom sticks and the front end of the tractor, spaced pulleys mounted upon said reinforcing frame members, an articulated upright frame structure having its lower ends pivotally mounted upon the forward ends of the longitudinal frame members, said upright frame structure extending above the top of the tractor, a pair of upwardly inclined forwardly extending boom supports pivotally mounted at their inner ends to said longitudinal frame members at points located behind the rear axle, said boom supports being pivotally connected adjacent their forward ends to said upright frame structure, a twin pulley device carried by and located between the boom supports at a point in advance of the pivotal connection between said boom supports and said upright frame structure, a dump bucket pivotally mounted upon the forward end portions of the boom sticks, power operated elevating means for said bucket and boom sticks carried by said boom supports and including a substantially horizontal driven shaft, a friction clutch and brake device and a twin winding drum mounted on said shaft and rotatable therewith when power from the tractor is transmitted to said shaft, means for transmitting power to said driven shaft, and cable means interconnecting said boom sticks and boom supports and adapted to be wound onto said drum for lifting the boom sticks and dump bucket to an elevation approximating that of the forward portions of the boom supports when said power operated means is actuated, said articulated upright frame structure comprising a lower inverted substantially U-shaped portion adapted for rocking movement with said longitudinal frame members when the tractor travels over uneven surfaces and a superimposed substantially A-shaped portion attached to the boom supports and adapted to remain stationary with said supports during the relative rocking movement of said lower frame portion.

2. A power shovel unit adapted to be mounted upon a tractor and operated thereby, comprising articulated longitudinal frame members detachably connected to the front and rear axles of said tractor, a pair of boom sticks pivotally mounted at their inner ends to said frame members at points located in front of said rear axle, said boom sticks extending longitudinally of the tractor to points in advance of the front end of said tractor and having an interconnecting transversely extending reinforcing frame member therebetween located intermediate the forward ends of said boom sticks and the front end of the tractor, spaced pulleys mounted upon said reinforcing frame members, an articulated upright frame structure having its lower ends pivotally mounted upon the forward ends of the longitudinal frame members, said upright frame structure extending above the top of the tractor, a pair of upwardly inclined forwardly extending boom supports pivotally mounted at their inner ends to said longitudinal frame members at points located behind the rear axle, said boom supports being pivotally connected adjacent their forward ends to said upright frame structure, a twin pulley device carried by and located between the boom supports at a point in advance of the pivotal connection between said boom supports and said upright frame structure, a dump bucket pivotally mounted upon the forward end portions of the boom sticks, power operated elevating means for said bucket and boom sticks carried by said boom supports and including a substantially horizontal driven shaft, a friction clutch and brake device and a twin winding drum mounted on said shaft and rotatable therewith when power from the tractor is transmitted to said shaft, means for transmitting power to said driven shaft, and cable means interconnecting said boom sticks and boom supports and adapted to be wound onto said drum for lifting the boom sticks and dump bucket to an elevation approximating that of the forward portions of the boom supports when said power operated means is actuated, said articulated upright frame structure comprising a lower inverted substantially U-shaped portion adapted for rocking movement with said longitudinal frame members when the tractor travels over uneven surfaces and a superimposed substantially A-shaped portion attached to the boom supports and adapted to remain stationary with said supports during the relative rocking movement of said lower frame portion, said upper and lower portions being detachably connected together and having anti-friction means located therebetween to facilitate the rocking movement of the lower portion relative to the upper portion.

3. A power shovel unit adapted to be mounted upon a tractor and operated thereby, comprising articulated longitudinal frame members detachably connected to the front and rear axles of said tractor, a pair of boom sticks pivotally mounted at their inner ends to said frame members at points located in front of said rear axle, said boom sticks extending longitudinally of the tractor to points in advance of the front end of said tractor and having an interconnecting transversely extending reinforcing frame member therebetween located intermediate the forward ends of said boom sticks and the front end of the tractor, spaced pulleys mounted upon said reinforcing frame members, an articulated upright frame structure having its lower ends pivotally mounted upon the forward ends of the longitudinal frame members, said upright frame structure extending above the top of the tractor, a pair of upwardly inclined forwardly extending boom supports pivotally mounted at their inner ends to said longitudinal frame members at points located behind the rear axle, said boom supports being pivotally connected adjacent their forward ends to said upright frame structure, a twin pulley device carried by and located between the boom supports at a point in advance of the pivotal connection between said boom supports and said upright frame structure, a dump bucket pivotally mounted upon the forward end portions of the boom sticks, power operated elevating means for said bucket and boom sticks carried by said boom supports and including a substantially horizontal driven shaft, a friction clutch and brake device and a twin winding drum mounted on said shaft and rotatable therewith when power from the tractor is transmitted to said shaft, means for transmitting power to said driven shaft, and cable means interconnecting said boom sticks and boom supports and adapted to be wound onto said drum for lifting the boom sticks and dump bucket to an elevation approximating that of the forward portions of the boom supports when said power operated means is actuated, said articulated upright frame structure comprising a lower inverted substantially U-shaped portion adapted for rocking movement with said longitudinal frame members when the tractor travels over uneven surfaces and a superimposed substantially A-shaped portion attached to the boom supports and adapted to remain stationary with said supports during the relative rocking movement of said lower frame portion, said upper frame portion carrying anti-friction rollers adapted to ride on the adjacent surface of the lower frame portion whereby to permit the relative rocking movement of the lower frame portion with respect to the upper frame portion.

4. A power shovel unit adapted to be mounted upon a tractor and operated thereby, comprising longitudinal frame members detachably connected to the axles of said tractor, boom sticks pivotally connected to said longitudinal frame members, a tiltable shovel mounted upon the outer end portions of said boom sticks, boom supports mounted at their rear ends to said longitudinal frame members and extending upwardly and forwardly beyond the front end of said tractor, power operated means carried by said boom supports and connected to said boom sticks whereby to permit the shovel to be elevated, means for transmitting power from the tractor to said power operated means for elevating the shovel, and an articulated upright frame structure for supporting the boom supports in elevated position above said tractor, said articulated upright frame structure comprising a lower section mounted upon said longitudinal frame members and movable therewith during up and down movements of said frame members and an upper section attached to said boom supports and mounted upon said lower section, said sections being detachably connected together and having anti-friction means interposed therebetween to permit the rocking movement of the lower section relative to said upper section.

5. A power shovel unit adapted to be mounted upon a tractor and operated thereby, comprising articulated longitudinal frame members detachably connected to the axles of said tractor, boom sticks pivotally connected to said longitudinal frame members, a tiltable shovel mounted upon the outer end portions of said boom sticks, boom supports mounted at their rear ends to said longitudinal frame members and extending upwardly and forwardly beyond the front end of said tractor, power operated means carried by said boom supports and connected to said boom sticks whereby to permit the shovel to be elevated, means for transmitting power from the tractor to said power operated means for elevating the shovel, and an articulated upright frame structure for supporting the boom supports in elevated position above said tractor, said articulated upright frame structure comprising a lower section mounted upon said longitudinal frame members and movable therewith during up and down movements of said frame members and an upper section attached to said boom supports and mounted upon said lower section, said sections being detachably connected together and having anti-friction means interposed therebetween to permit the rocking movement of the lower section relative to said upper section.

6. In a power shovel unit adapted to be mounted upon a tractor and operated thereby, comprising longitudinal frame members detachably connected to the axles of said tractor, boom sticks pivotally connected to said longitudinal frame members, a tiltable shovel mounted upon the outer end portions of said boom sticks, boom supports mounted at their rear ends to said longitudinal frame members and extending upwardly and forwardly beyond the front end of said tractor, power operated means carried by said boom supports and connected to said boom sticks whereby to permit the shovel to be elevated, means for transmitting power from the tractor to said power operated means for elevating the shovel, and an articulated upright frame structure for supporting the boom supports in elevated position above said tractor, said articulated upright frame structure comprising a lower section mounted upon said longitudinal frame members and movable therewith during up and down movements of said frame members and an upper section attached to said boom supports and mounted upon said lower section, said sections being detachably connected together and having anti-friction means interposed therebetween to permit the rocking movement of the lower section relative to said upper section, said longitudinal frame members having a counterweight mounted upon their rear end portions.

7. A power shovel unit adapted to be mounted upon a tractor and operated thereby, comprising longitudinal frame members detachably connected to said tractor, boom sticks pivotally connected to said longitudinal frame members, a tiltable shovel mounted upon the outer end portions of said boom sticks, boom supports mounted at their rear ends to said longitudinal frame members and extending upwardly and forwardly beyond the front end of said tractor, power operated elevating means carried by said boom supports and connected to said boom sticks whereby to permit the shovel to be elevated, means for transmitting power from the tractor to said power operated means for elevating the shovel, and an upright frame having side members converging toward their upper ends and detachably connected to the boom supports for supporting the boom supports in elevated position above said tractor, the side members of said upright frame being detachably connected at their lower ends to said longitudinal frame members.

8. A power shovel unit adapted to be mounted upon a tractor and operated thereby, comprising longitudinal frame members detachably connected to said tractor, boom sticks pivotally connected to said longitudinal frame members, a tiltable shovel mounted upon the outer end portions of said boom sticks, boom supports mounted at their rear ends to said longitudinal frame members and extending upwardly and forwardly beyond the front end of said tractor, power operated elevating means carried by said boom supports and connected to said boom sticks whereby to permit the shovel to be elevated, means for transmitting power from the tractor to said power operated means for elevating the shovel, and an upright frame having side members converging toward their upper ends and detachably connected to the boom supports for supporting the boom supports in elevated position above said tractor, the side members of said upright frame being detachably connected at their lower ends to said longitudinal frame members, said power operated elevating means including a cable, a friction clutch and brake device and a winding drum.

ADAM A. WALDECKER.